(12) United States Patent
Park

(10) Patent No.: US 7,996,132 B2
(45) Date of Patent: Aug. 9, 2011

(54) FAST SENSING SYSTEM AND METHOD FOR SOIL- AND CURB-TRIPPED VEHICLE ROLLOVERS

(75) Inventor: Seo-Wook Park, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 449 days.

(21) Appl. No.: 12/265,896

(22) Filed: Nov. 6, 2008

(65) Prior Publication Data

US 2009/0143944 A1    Jun. 4, 2009

Related U.S. Application Data

(60) Provisional application No. 60/991,190, filed on Nov. 29, 2007.

(51) Int. Cl.
*B60R 21/013* (2006.01)
(52) U.S. Cl. ............. 701/46; 701/45; 180/282; 280/735
(58) Field of Classification Search .................... 701/45, 701/46; 180/282; 280/735
See application file for complete search history.

(56) References Cited

U.S. PATENT DOCUMENTS

| | | | |
|---|---|---|---|
| 5,282,134 A | 1/1994 | Gioutsos et al. | |
| 5,339,242 A | 8/1994 | Reid et al. | |
| 5,483,449 A | 1/1996 | Caruso et al. | |
| 5,583,771 A | 12/1996 | Lynch et al. | |
| 5,667,244 A | 9/1997 | Ito et al. | |
| 5,790,404 A | 8/1998 | Faye et al. | |
| 6,002,975 A | 12/1999 | Schiffmann et al. | |
| 6,038,495 A | 3/2000 | Schiffmann | |
| 6,061,616 A | 5/2000 | Ohno et al. | |
| 6,301,536 B1 | 10/2001 | Vaessen et al. | |
| 6,421,592 B1 | 7/2002 | Bargman et al. | |
| 6,529,811 B2 | 3/2003 | Watson et al. | |
| 6,542,073 B2 | 4/2003 | Yeh et al. | |
| 6,584,388 B2 | 6/2003 | Schubert et al. | |
| 6,607,212 B1 | 8/2003 | Reimer et al. | |
| 6,618,655 B2 | 9/2003 | Tobaru et al. | |

(Continued)

FOREIGN PATENT DOCUMENTS

DE    10221466 A1    12/2003

(Continued)

OTHER PUBLICATIONS

European Search Report dated Feb. 12, 2007 in European Application No. EP06400019 (6 pages).

(Continued)

*Primary Examiner* — Ruth Ilan
(74) *Attorney, Agent, or Firm* — Michael Best & Friedrich LLP

(57) ABSTRACT

A method and a system of controlling a restraint device in a vehicle during a crash. The method includes sensing a lateral acceleration without using other vehicle dynamic information. The method also includes integrating the sensed lateral acceleration to determine a change in (or delta of) lateral velocity, low-pass filtering the sensed lateral acceleration, and extrapolating the delta lateral velocity and the filtered acceleration to estimate a vehicle lateral velocity. The method also includes sensing a vertical acceleration, integrating the sensed vertical acceleration, combining the integrated vertical acceleration and the predicted vehicle lateral velocity to give an indication of how severely the vehicle laterally hits an obstacle, and generating a deployment signal to activate the restraint device.

20 Claims, 7 Drawing Sheets

U.S. PATENT DOCUMENTS

| | | |
|---|---|---|
| 6,654,671 B2 | 11/2003 | Schubert |
| 6,687,576 B2 | 2/2004 | Mattes et al. |
| 6,694,225 B2 | 2/2004 | Aga et al. |
| 6,826,468 B2 | 11/2004 | Williams |
| 6,856,868 B1 | 2/2005 | Le et al. |
| 7,057,503 B2 | 6/2006 | Watson |
| 7,076,353 B2 | 7/2006 | Ogata et al. |
| 7,269,483 B2 | 9/2007 | Schubert et al. |
| 7,660,654 B2* | 2/2010 | Lu et al. .......................... 701/36 |
| 7,826,948 B2* | 11/2010 | Messih et al. .................... 701/38 |
| 2002/0169577 A1 | 11/2002 | Mattes et al. |
| 2002/0189883 A1 | 12/2002 | Lahmann et al. |
| 2003/0088349 A1 | 5/2003 | Schubert et al. |
| 2003/0093201 A1 | 5/2003 | Schubert et al. |
| 2003/0158633 A1 | 8/2003 | Schubert |
| 2003/0182041 A1 | 9/2003 | Watson |
| 2003/0182042 A1* | 9/2003 | Watson et al. ................... 701/45 |
| 2004/0002802 A1 | 1/2004 | Ide et al. |
| 2004/0073346 A1 | 4/2004 | Roelleke |
| 2004/0176893 A1 | 9/2004 | Ogata et al. |
| 2004/0176897 A1 | 9/2004 | Williams |
| 2004/0199317 A1 | 10/2004 | Ogata et al. |
| 2005/0159872 A1 | 7/2005 | Geborek et al. |
| 2005/0171672 A1 | 8/2005 | Wallner |
| 2005/0209757 A1* | 9/2005 | Kueblbeck et al. ............. 701/46 |
| 2006/0025912 A1 | 2/2006 | Haering et al. |
| 2006/0041336 A1 | 2/2006 | Schubert et al. |
| 2006/0058933 A1 | 3/2006 | Schubert |
| 2006/0161323 A1 | 7/2006 | Sawahata |
| 2006/0178808 A1 | 8/2006 | Wu et al. |
| 2006/0229783 A1 | 10/2006 | Lahmann et al. |
| 2006/0238026 A1 | 10/2006 | Lich |
| 2006/0253239 A1* | 11/2006 | Williams .......................... 701/45 |
| 2007/0168098 A1 | 7/2007 | Lich et al. |
| 2007/0185632 A1* | 8/2007 | Blos et al. ........................ 701/38 |
| 2008/0303254 A1* | 12/2008 | Le et al. ......................... 280/735 |

FOREIGN PATENT DOCUMENTS

| | | |
|---|---|---|
| DE | 102005052251 A1 | 5/2007 |
| DE | 102006009372 A1 | 9/2007 |
| EP | 1110835 A2 | 6/2001 |
| EP | 1219500 A2 | 7/2002 |
| EP | 1717108 A2 | 2/2006 |
| WO | 9947383 A1 | 9/1999 |
| WO | 2005030536 A1 | 4/2005 |

OTHER PUBLICATIONS

European Search Report dated Apr. 7, 2009 in European Application No. EP 08400052.0 (8 pages).

* cited by examiner

FAST SENSING SYSTEM AND METHOD FOR SOIL- AND CURB-TRIPPED VEHICLE ROLLOVERS

RELATED APPLICATIONS

This application claims the benefit of prior filed co-pending U.S. provisional patent application Ser. No. 60/991,190, filed Nov. 29, 2007, the entire contents of which are hereby incorporated by reference.

BACKGROUND

Embodiments of the invention relate to a rollover-sensing system, and particularly to a rollover-sensing system that discriminates and senses soil-tripped rollover events, curb-tripped rollover events, or both.

Vehicle rollover events are situations in which vehicle occupants are at risk of serious injury. To protect the vehicle occupants from injury, vehicles typically include restraint devices such as airbags and seatbelts that can be actuated during a rollover or possible rollover. The accuracy and timeliness of deployment and actuation of these restraint devices are factors in their effectiveness.

There are different types of rollover events. For example, a vehicle can be involved in an upward rollover event when the vehicle is traveling in a forward direction, and then travels across an object or an inclined surface resulting in an upward roll. A vehicle can be involved in a downward rollover event when the vehicle is traveling in a forward direction, and then travels across an object or a declined surface resulting in a downward roll. A vehicle can be involved in an un-tripped rollover event when the vehicle is traveling and tilting beyond its critical stability angle.

A vehicle can be involved in a tripped rollover event when the vehicle is sliding laterally and hits an obstacle. For example, a vehicle can be involved in a soil- or curb-tripped rollover event. A soil-tripped rollover event occurs when the vehicle is initially traveling on a roadway, and begins a slide that takes the vehicle off the roadway. As the vehicle slides off the roadway, the wheels of the vehicle may contact unpaved ground, grass, or soil. Soil may build up near the wheels of the vehicle and create a lip or mound of soil. The mound may reach a sufficient size or configuration such that it acts as a barrier over which the wheels and, consequently, the vehicle trip. A curb-tripped rollover event occurs when the vehicle is initially traveling on a roadway, and then slides sideways into a curb that acts as a barrier over which the wheels and, consequently, the vehicle trip. In such a case, a lateral impact force is typically exerted against an obstacle, and is stronger than that of a soil-tripped event.

SUMMARY

Simply detecting the existence of a rollover event can be useful. However, numerous factors may be involved in determining when and how to deploy vehicle restraint devices before or upon the occurrence of a rollover event. For example, in a soil- or curb-tripped rollover event, the vehicle experiences a lateral deceleration when it contacts the soil or curb (before the actual rollover occurs). The lateral deceleration often causes the vehicle occupants to move rapidly into positions within the vehicle that may be unsafe. In such cases, restraint devices have to be deployed before the vehicle occupants are moved out of a seating position into other and possibly unsafe positions within the vehicle. In other words, if restraint devices are deployed at the time vehicle rollover occurs, the occupants may have already moved to positions where activation of the restraint devices is ineffective or injurious.

Some current vehicles include roll rate sensors that are configured to sense the rate of change of the roll angle experienced by the vehicle, lateral acceleration sensors that are configured to sense the lateral deceleration experienced by the vehicle, and processors that process the data from these sensors. However, these processors are often unable to determine whether to deploy the restraint devices before the occupants have moved into positions within the vehicle that may be unsafe and, therefore, are not always adequate for use in an occupant safety system, particularly when trying to protect occupants during a partial or complete soil- or curb-tripped rollover.

In some other cases, vehicles include roll angle sensors to determine a roll angle during a possible rollover event. A threshold for such roll angle is typically set at 10 degrees. However, when it is time to deploy restraint devices, the roll angle determined is usually less than 10 degrees. As a result, there is a delayed deployment of restraint devices. In other words, the restraint devices are deployed after a critical time. Activating restraint devices later than expected can also be injurious. For example, deploying restraint devices such as an inflatable curtain airbag later than expected can result in trapping an occupant between a window and the airbag. To compensate for the delay, other information such as lateral speed is also used to predict rollover behavior. Several vehicle dynamic parameters are generally used to determine the lateral speed. These parameters can include vehicle longitudinal speed, yaw rate, steering wheel angle, and the like. Using these parameters in a rollover detection system can be costly, but more importantly, time-consuming in terms of processing.

Accordingly, there is a need to improve the deployment of restraint devices before a possible rollover event occurs. There is also a need to use fewer sensors and sensed parameters. One embodiment of the invention provides a method of estimating or determining lateral speed using a limited number of sensors and, as a consequence, without using vehicle dynamic parameters (such as those mentioned) above. Based on the determined lateral speed, a rollover or non-rollover condition, a soil-tripped or curb-tripped condition or event, and a critical acceleration are determined. Meanwhile, a critical angular rate is also determined based on the determined lateral speed. A restraint deployment decision is then made based on the determined lateral speed and the critical angular rate.

In one embodiment, the invention provides a method of controlling a restraint device. The method includes sensing a sensed lateral acceleration without using other vehicle dynamic information. The method also includes integrating the sensed lateral acceleration to get a change in (or delta of) lateral velocity, low-pass filtering the sensed lateral acceleration, and extrapolating the delta lateral velocity and the filtered acceleration to estimate a predicted vehicle lateral velocity. In the case of a curb-tripped rollover event, a vertical vehicle movement can be observed when a wheel of the vehicle impacts an obstacle such as a curb or a rock. The method also includes sensing a vertical acceleration, integrating the sensed vertical acceleration, combining the integrated vertical acceleration and the predicted vehicle lateral velocity to give an indication of how severely the vehicle laterally impacts an obstacle.

The invention also provides a method of separating or distinguishing a soil-tripped rollover event from a curb-tripped rollover event. In some cases, it may be necessary to deal with soil-tripped rollover events and curb-tripped rollover events individually or separately due to different vehicle behavior. Separating the soil-tripped rollover events from a curb-tripped rollover event is generally based on a lookup table domain composed of the combined vehicle velocity and the filtered lateral acceleration. In some cases, the lookup table domain is divided into two regions by a path decision line in the form of a straight line. One of the regions corresponds to a curb-tripped rollover, while the other of the regions corresponds to a soil-tripped rollover.

The method also includes discriminating a rollover over event from a non-rollover event with a tunable threshold curve in the lookup table domain. In some cases, the threshold curve includes a maximum lateral acceleration, a critical sliding velocity, and a static stability factor. The threshold curve can be tuned by an envelope curve of a non-rollover event. Using the tunable threshold curve, a critical lateral acceleration can be determined from the combined vehicle velocity. If the filtered lateral acceleration exceeds the critical lateral acceleration, an add-on value is provided to a decision block based on angular rate signal processing. The add-on value (in general) sensitizes the critical angular rate in the main decision block.

The method also includes selecting one of a curb-tripped rollover threshold and a soil-tripped rollover threshold based on the path decision line. The method also includes sensing an angular rate, low-pass filtering the angular rate, and summing the angular rate to obtain a roll angle. The method also includes determining a critical angular rate based on the selected rollover event, the sensed angular rate, and the roll angle, and subtracting the critical angular rate add-on value from the critical angular rate to obtain a sensitized critical angular rate. The method includes comparing the filtered angular rate with the sensitized critical angular rate, and deploying a restraint device based on the comparison.

In another embodiment, the invention provides a rollover sensing system that performs fast classification and discrimination of soil- and curb-tripped rollover events so that the restraint devices can be deployed early in the event.

In yet another embodiment, the invention provides a method of controlling a restraint device in a vehicle during a possible crash. The method includes sensing a lateral acceleration or something that is representative or indicative of a lateral acceleration of the vehicle, sensing a vertical acceleration or something that is representative or indicative of a vertical acceleration of the vehicle, sensing an angular rate or something that is representative or indicative of an angular acceleration of the vehicle, and determining a combined velocity and a filtered lateral acceleration based on the sensed lateral and vertical acceleration. The method also includes classifying the crash into one of a soil-tripped crash and a curb-tripped crash based on the combined velocity and filtered lateral acceleration, selecting a rollover threshold based on the classified crash, and determining if the classified crash will result in a rollover based on the rollover threshold, the combined velocity, the filtered lateral acceleration, and the sensed angular rate. The method also includes generating a signal indicative of deploying the restraint device based on the rollover determination.

Another embodiment includes a method of controlling a restraint device in a vehicle during a possible crash. The method includes sensing a lateral acceleration, a vertical acceleration, and an angular rate of the vehicle, filtering the lateral acceleration and the angular rate, and integrating the lateral acceleration to obtain a lateral velocity, the vertical acceleration to obtain a vertical velocity, and the angular rate to obtain an angle. The method also includes determining a combined velocity based on the filtered lateral acceleration, the lateral velocity, and the vertical velocity, classifying the crash based on the combined velocity and filtered lateral acceleration, and determining a critical lateral acceleration and a critical angular rate based on the classified crash. The method also includes comparing the critical lateral acceleration with a current value of the filtered lateral acceleration, and the critical angular rate with a current value of the filtered angular rate, and generating a deployment signal to activate the restraint device.

Yet another embodiment includes a method of controlling a restraint device in a vehicle during a crash. The method includes determining a plurality of values indicative of a first directional acceleration, a plurality of values indicative of a second directional acceleration, and a plurality of values indicative of an angular rate of the vehicle, and estimating a first directional velocity from the values indicative of the first directional acceleration, a second directional velocity from the values indicative of the second directional acceleration, and a roll angle value from the values indicative of the angular rate.

The method also includes determining a time-weighed directional acceleration based on the values of the first directional acceleration, determining a combined velocity based on the time-weighed directional acceleration, the first directional velocity, and the second directional velocity, and classifying the crash based on the combined velocity and the values indicative of the first directional acceleration. The method also includes determining a critical first directional acceleration and a critical angular rate based on the classified crash, comparing the critical first directional acceleration with a current value of the first directional acceleration, and the critical angular rate with a current value of the angular rate, and generating a deployment signal when a value corresponding to the values of the first directional acceleration is at least as much as the critical first directional acceleration, and when a value corresponding to the values of the angular rate is at least as much as the critical angular rate.

Still another embodiment includes a control system for a restraint device in a vehicle during a crash. The system includes a lateral acceleration sensor configured to determine a plurality of values indicative of lateral accelerations of the vehicle, a vertical acceleration sensor configured to determine a plurality of values indicative of vertical accelerations of the vehicle, and an angular rate sensor configured to determine a plurality of values indicative of angular rates of the vehicle. The system also includes a first filter configured to filter the values indicative of the lateral acceleration and a second filter configured to filter the values indicative of the angular rate, a first summing module configured to sum the values indicative of the lateral acceleration to obtain a lateral velocity, a second summing module configured to sum the values indicative of the vertical acceleration to obtain a vertical velocity, and a third summing module configured to sum the values indicative of the angular rate to obtain an angle, and a combined velocity module configured to determine a combined velocity based on the lateral acceleration, the lateral velocity, and the vertical velocity.

The system also includes a classifier configured to classify the crash based on the combined velocity and filtered lateral acceleration, a critical lateral acceleration threshold module configured to determine a critical lateral acceleration, and a critical angular rate threshold module configured to determine a critical angular rate. The system also includes a first comparator configured to compare the critical lateral acceleration with a current value of the filtered lateral acceleration, a second comparator configured to compare the critical angular rate with a current value of the filtered angular rate, and a deployment signal generator configured to generate a deployment signal to activate the restraint device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" and "controller" may include or refer to both hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization.

Embodiments of the invention relate to a method and system for controlling a restraint device in a vehicle during a possible crash. In one embodiment, the possible crash is classified based on sensed parameters such as lateral accelerations, and a number of calculated or determined parameters are considered and compared with a plurality of thresholds. In a specific embodiment, the system includes a sensor to sense a plurality of vehicle conditions having values that are indicative of vehicle lateral accelerations. The system also includes a classifier to classify the impending crash based on the lateral accelerations. The system also includes a comparator that compares the lateral accelerations with a lateral acceleration threshold, and a roll characteristic signal generator that determines a roll value which can be based on a roll rate, a roll acceleration, and a roll angle, and compares the roll value with a roll value threshold. The system also includes a signal generator to activate the restraint device when the lateral acceleration threshold is crossed and the roll value threshold is crossed.

Figure 1:
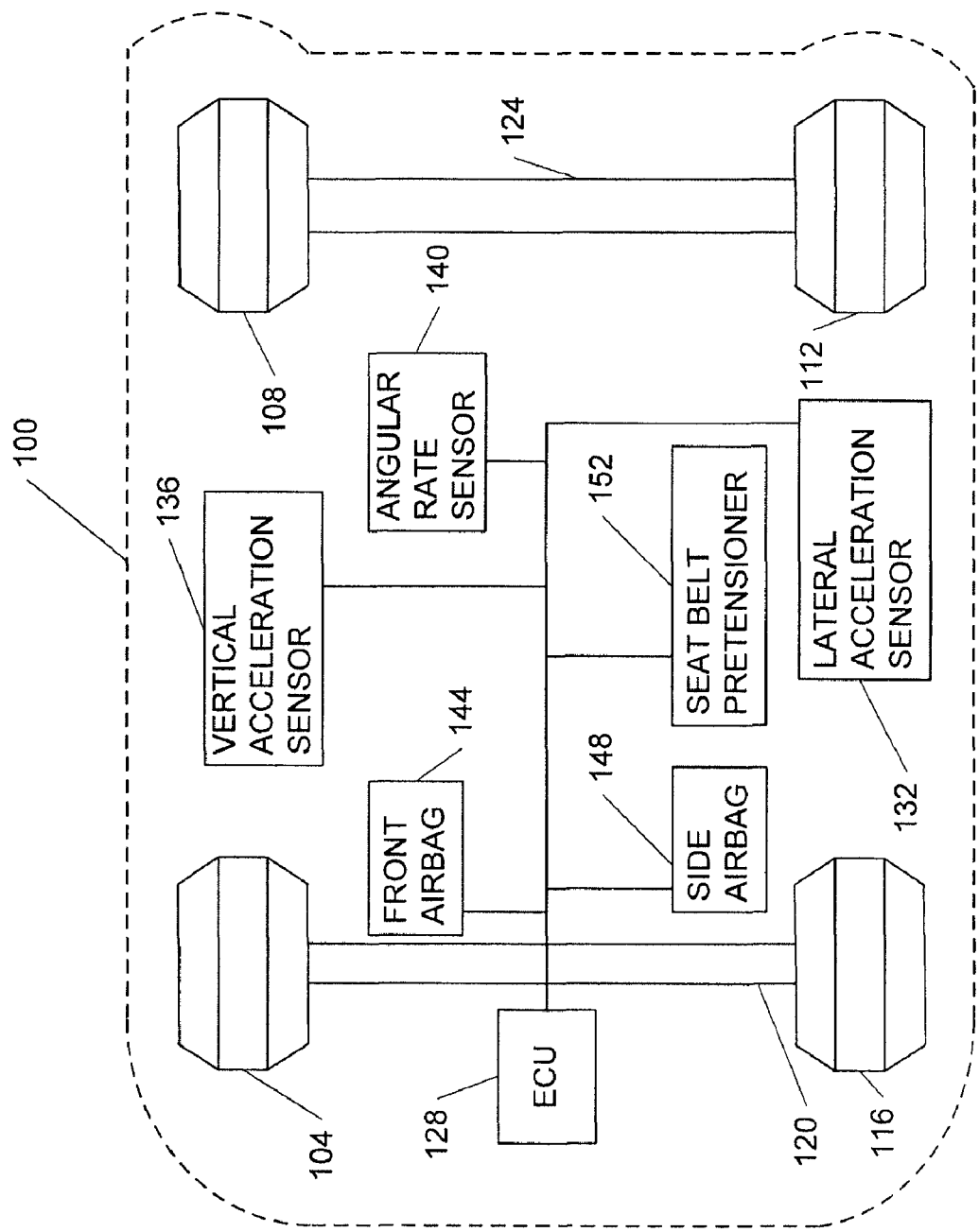
FIG. 1 illustrates a vehicle that includes a roll-over sensing system.

FIG. 1 shows a schematic plan view of a vehicle 100. The vehicle 100 has four wheels 104, 108, 112, and 116. In other embodiments, the vehicle 100 can have a different number of wheels. The wheels 104, 108, 112, and 116 are connected to two axles 120 and 124, as shown. The vehicle 100 includes an electronic processing unit ("ECU") 128 that monitors sensors such as a first directional or lateral acceleration sensor 132, a second directional or vertical acceleration sensor 136, and an angular rate sensor 140. The vertical acceleration sensor 136, and the lateral acceleration sensor 132 are shown as individual sensors generically. The vehicle 100 also includes a plurality of restraint devices such as front airbags 144, side airbags 148, and a seat-belt pretensioner 152. Although FIG. 1 shows only three types of restraint devices, other types of restraint devices such as head and torso airbags can also be used in the vehicle 100.

Sensors such as the lateral acceleration sensor 132 detect and monitor a condition of the vehicle that is indicative of an amount of lateral acceleration experienced by the vehicle 100. Sensors such as the lateral acceleration sensor 132, the vertical acceleration sensor 136, and the angular rate sensor 140 are configured to detect a plurality of conditions of the vehicle 100. Collectively, values of the signals output by the sensors 132, 136, and 140 are referred to as sensed values, or values hereinafter. In some embodiments, the lateral acceleration sensor 132 can contain side-impact sensors or high-force lateral acceleration sensors that can be used to sense side crash forces, and a low-force lateral acceleration sensor that can be used to sense rollover crash forces. If the lateral acceleration sensor 132 is equipped with calibration circuitry or microprocessors therein, the motions can be converted internally to a calibrated form. Otherwise, the conditions can be converted into calibrated signals by other external processes.

It should also be noted that the sensed values can come directly or indirectly from the sensors such as the lateral acceleration sensor 132. The sensed values can be sent or delivered to the ECU 128 via other vehicle systems. These other vehicle systems can include, but are not limited to, an antilock braking controller, an electronic stability controller, a restraint electronics controller, and the like. It should also be noted that the sensed values can also be configured to be available at the ECU 128 using direct electrical connections from the sensors such as the lateral acceleration sensor 132, direct electrical connections to other vehicle systems, or via a vehicle communication bus.

Figure 2:
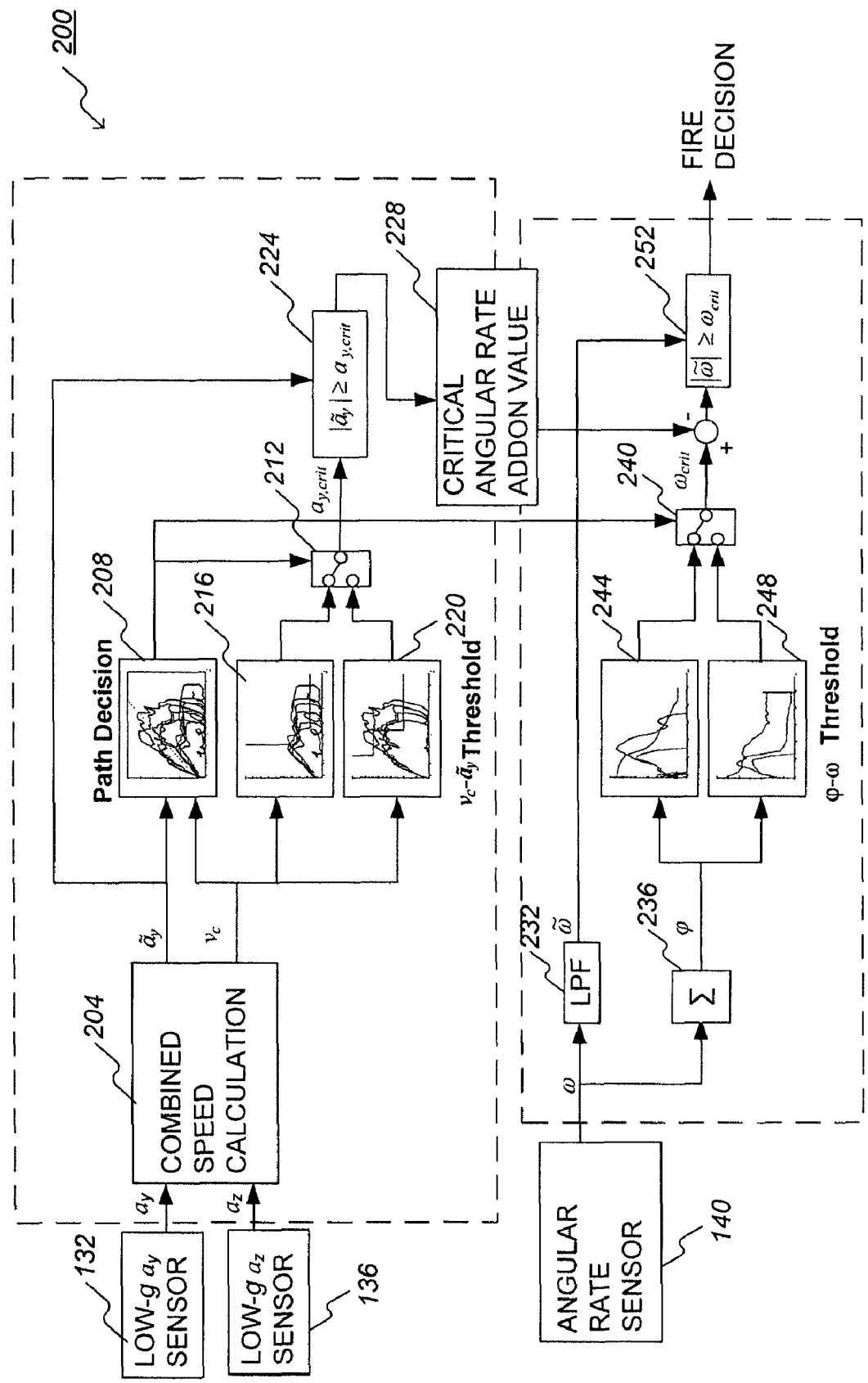
FIG. 2 is a diagram of a control system for the vehicle of FIG. 1.

FIG. 2 shows a control system 200 used in the vehicle 100 of FIG. 1 in block diagram format, wherein like numerals refer to like parts. The control system 200 includes the lateral acceleration sensor 132, the vertical acceleration sensor 136, and the angular rate sensor 140. Values detected by the lateral acceleration sensor 132 and the vertical acceleration sensor 136 are processed by a combined velocity determination module 204 to generate a combined velocity, $v_c$, and a filtered lateral acceleration, $a_y$, detailed hereinafter.

A path decision module 208 then processes the combined velocity, $v_c$, and the filtered lateral acceleration, $a_y$, to classify the crash. In some embodiments, the crash is either a soil-tripped rollover crash or a curb-tripped rollover crash. The path decision module 208 feeds a decision based on the classified crash to a crash switch 212, which switches to receive outputs from either a soil-tripped rollover threshold module 216, or a curb-tripped rollover threshold module 220. The soil-tripped rollover threshold module 216 receives the combined velocity, $v_c$, to determine a critical lateral acceleration, $a_{y,crit}$. Similarly, the curb-tripped rollover threshold module 220 also receives the combined velocity, $v_c$, to determine a critical lateral acceleration, $a_{y,crit}$. Once the crash switch 212 has switched to receive the critical lateral acceleration, $a_{y,crit}$, from one of the soil-tripped rollover threshold module 216 and curb-tripped rollover threshold module 220, the critical lateral acceleration, $a_{y,crit}$, is compared to a current value of the filtered lateral acceleration at a comparator module 224. If the critical lateral acceleration, $a_{y,crit}$, is less than the current value of the filtered lateral acceleration, a critical angular rate add-on value module 228 generates an angular rate add-on value to be processed later.

A low-pass filter 232 filters a plurality of angular rate values, ω, measured by the angular rate sensor 140 to obtain a plurality of filtered angular rates, $\tilde{\omega}$. A summer 236 sums the plurality of angular rate values, ω, to obtain a roll angle, φ. The path decision module 208 as discussed earlier feeds the crash decision based on the classified crash to a second crash switch 240, which switches to receive outputs from either a second soil-tripped rollover threshold module 244 or a second curb-tripped rollover threshold module 248. The second soil-tripped rollover threshold module 244 receives the roll angle, φ, to determine a critical angular rate, $\omega_{crit}$. Similarly, the second curb-tripped rollover threshold module 248 also receives the roll angle, φ, to determine the critical angular rate, $\omega_{crit}$. Once the second crash switch 240 has switched to receive the critical angular rate, $\omega_{crit}$, from one of the second soil-tripped rollover threshold module 244 and second curb-tripped rollover threshold module 248, the angular rate add-on value from the critical angular rate add-on value module 228 is subtracted from the critical angular rate, $\omega_{crit}$, to result in a sensitized critical angular rate, $\omega_{s,crit}$. A second comparator module 252 compares a current value of the filtered angular rate, $\tilde{\omega}$, with the sensitized critical angular rate, $\omega_{crit}$. If the current value of the filtered angular rate, $\tilde{\omega}$, is greater than the current value of the sensitized critical angular rate, $\omega_{s,crit}$, a deployment signal generator generates a deployment signal, which in turn activates the restraint devices.

Figure 3:
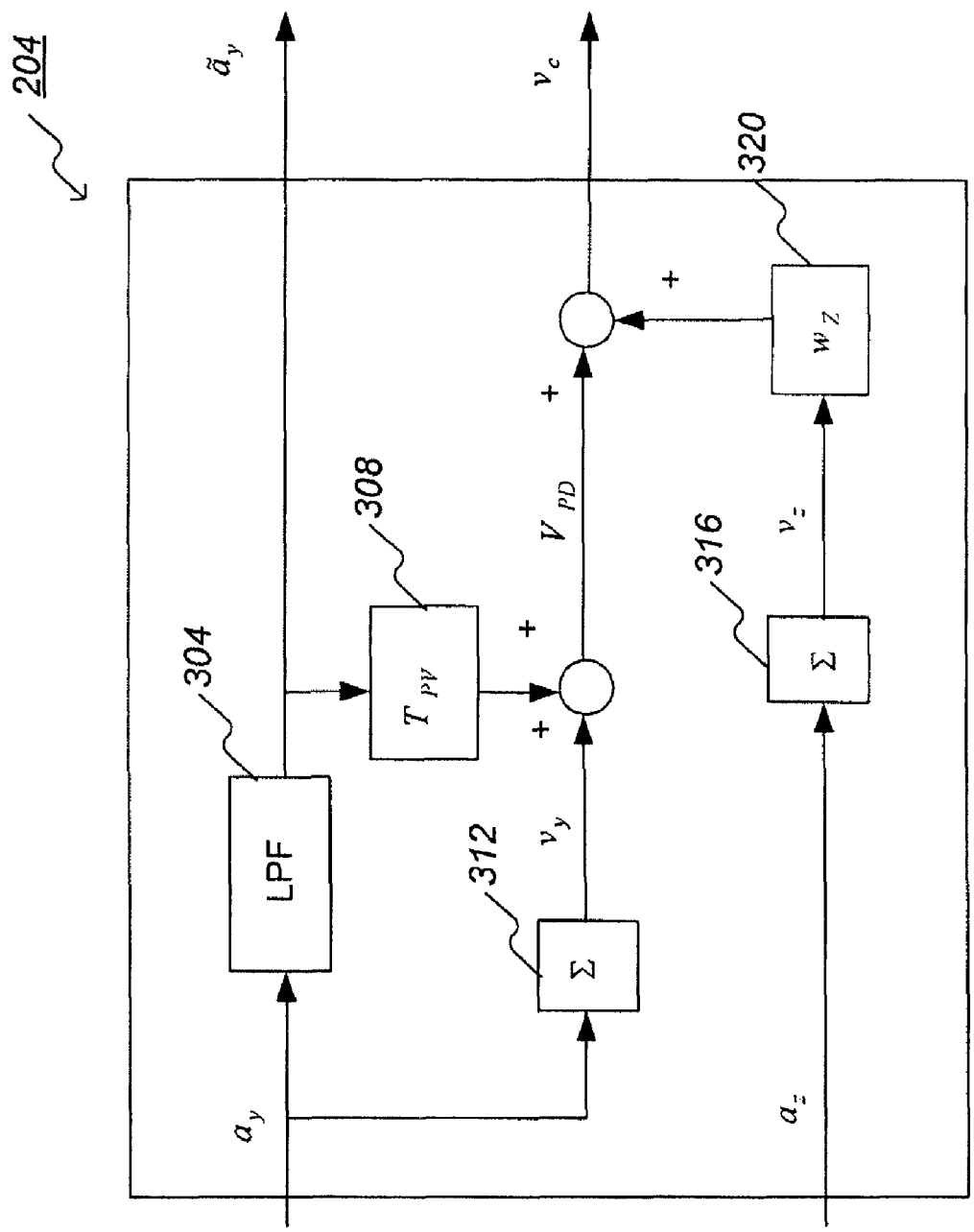
FIG. 3 illustrates an embodiment of a combined speed calculation module of FIG. 2.

FIG. 3 illustrates the combined velocity determination module 204. A predicted vehicle lateral velocity can be calculated by EQUATION (1) as follows.

$$v_{PD} = \Sigma a_y + T_{PV} \times \tilde{a}_y \qquad (1)$$

where $\tilde{a}_y$ is a filtered lateral acceleration determined from a low-pass filter ("LPF") 304, and $T_{PV}$ represents a time factor for the predicted vehicle lateral velocity that weighs the filtered lateral acceleration. A summing module 312 sums a plurality of values indicative of the sensed lateral acceleration, $a_y$, to produce a delta lateral velocity, $v_y$. The weighed and filtered lateral acceleration is summed with the delta lateral velocity, $v_y$, to obtain a predicted lateral velocity. Similarly, a second summing module 316 sums a plurality of values indicative of the sensed vertical acceleration, $a_z$, to produce a delta vertical velocity, $v_z$. The delta vertical velocity, $v_z$, is weighed with a weighing factor of the vertical velocity at block 320. The weighed vertical velocity is added to the predicted lateral velocity, $v_{PD}$, to obtain a combined velocity, $v_c$, as shown in EQN. (2) as follows. The combined velocity gives an indication of how severely the vehicle laterally hits the obstacle.

$$v_c = v_{PD} + w_z \times \Sigma a_z \qquad (2)$$

Figure 4:
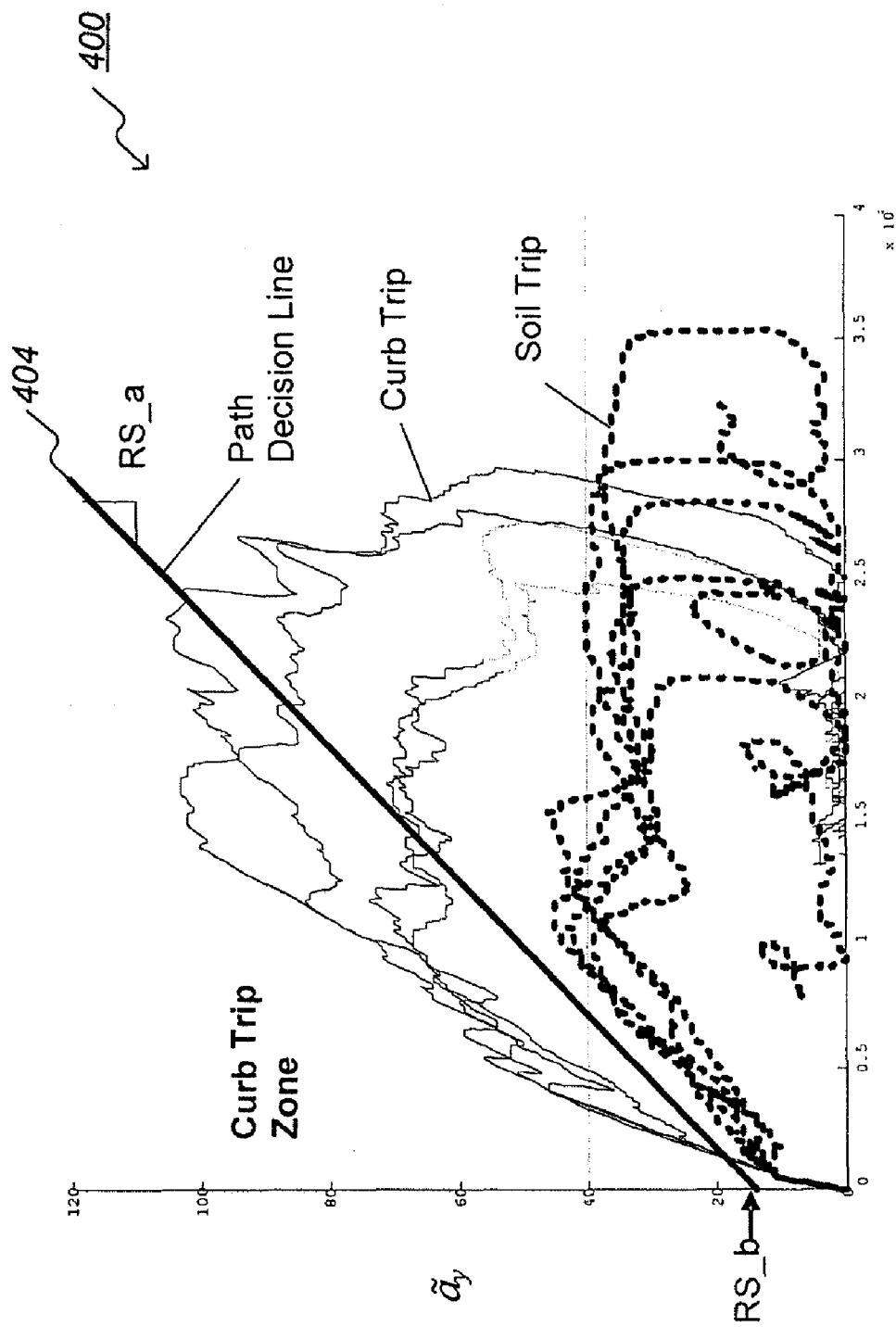
FIG. 4 illustrates a path decision line for soil- or curb-tripped rollover.

FIG. 4 is a path decision module 400 (208 of FIG. 2) for soil- or curb-tripped rollover. Particularly, the path decision module 400 separates a soil-tripped rollover from a curb-tripped rollover with a path decision line 404. The path decision line 404 as shown is described by a straight line with its x-axis values being the combined velocity and y-axis values being the filtered lateral acceleration. Although the path decision line 404 is shown as a straight line, the path decision line 404 can also take other linear forms. In the embodiment shown, the path decision line 404 is described in EQN. (3) as follows.

$$\tilde{a}_{y,path} = v_c \times RS\_a + RS\_b \qquad (3)$$

where, RS_a is a slope, and RS_b is an y-intercept of path decision line. The slope and the intercept are generally determined experimentally, for example, in a worst case scenario.

Figure 5:
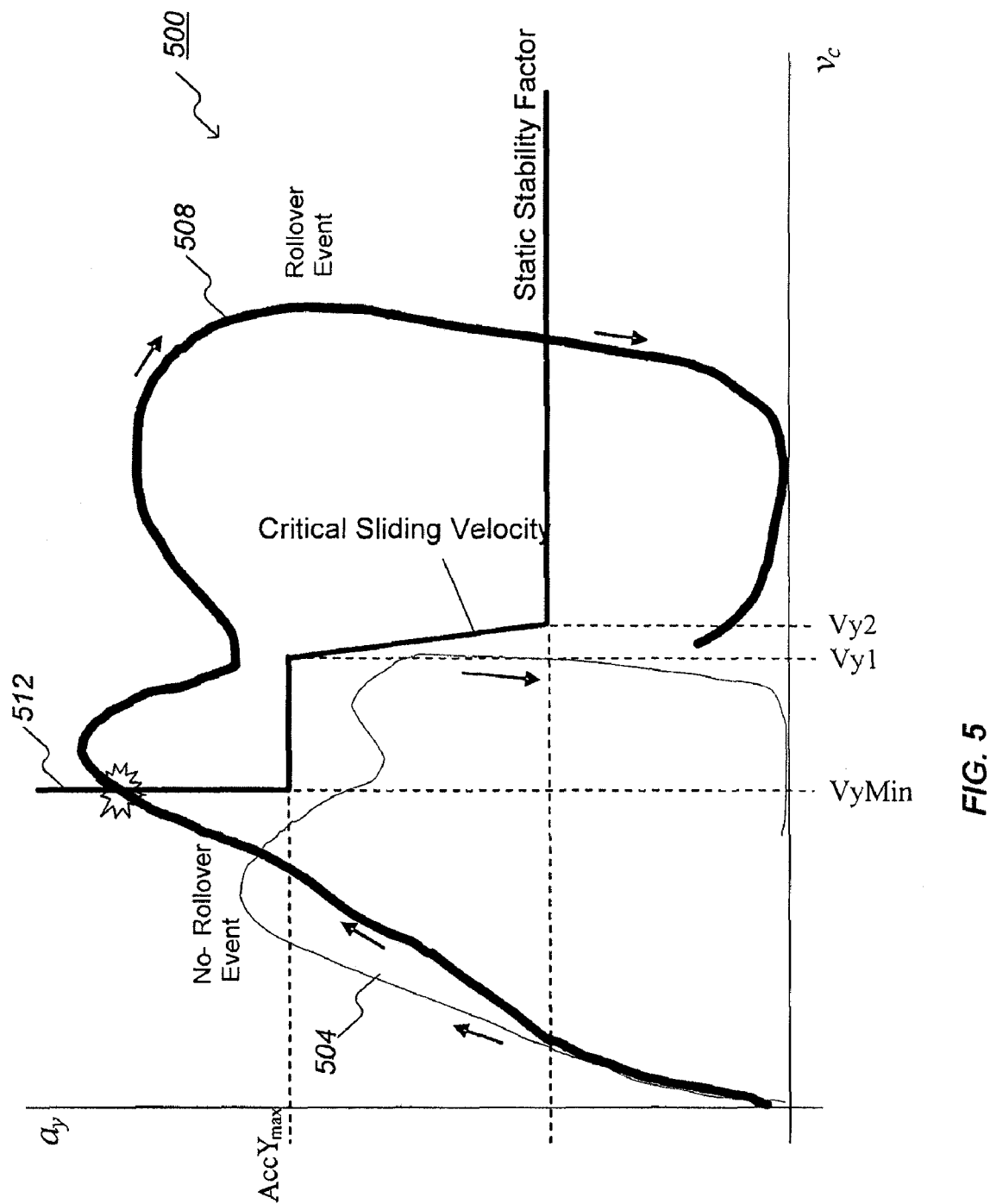
FIG. 5 is a threshold plot for discriminating between a rollover and a non-rollover event.

FIG. 5 is a threshold plot 500 for a discriminating between rollover and non-rollover events. Curve 504 represents a non-rollover event, whereas curve 508 represents a rollover event. Particularly, a curb-tripped rollover usually shows a rapidly increasing lateral acceleration at low lateral speed. On the other hand, a soil-tripped rollover usually experiences a slowly developing lateral acceleration. As such, a threshold 512 can be set by partially enveloping the non-rollover event. Each section of the threshold 512 represents a maximum lateral acceleration, a critical sliding velocity, and a static stability factor, respectively.

Figure 6A:
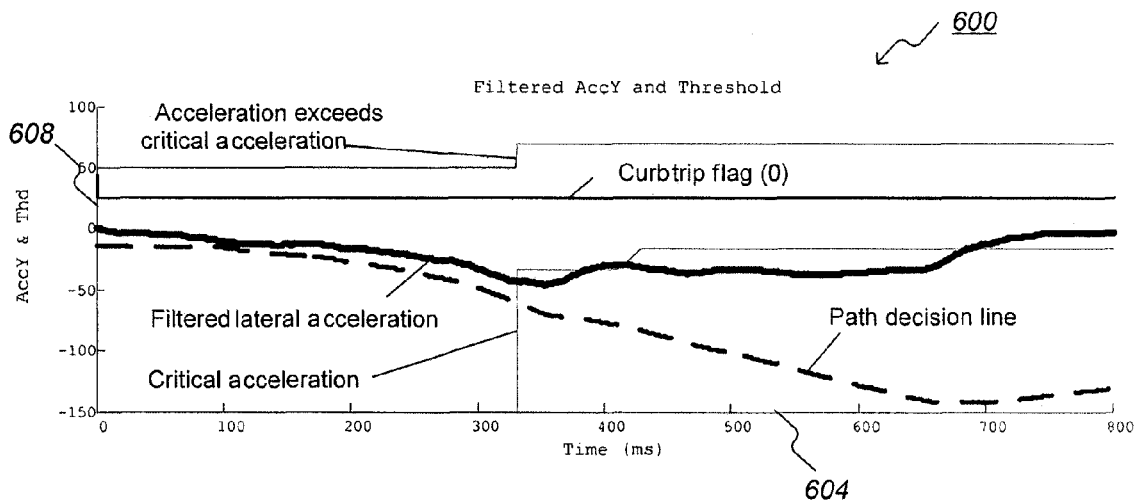
FIG. 6 is a diagram of a response for a soil-tripped rollover event.
Figure 6B:
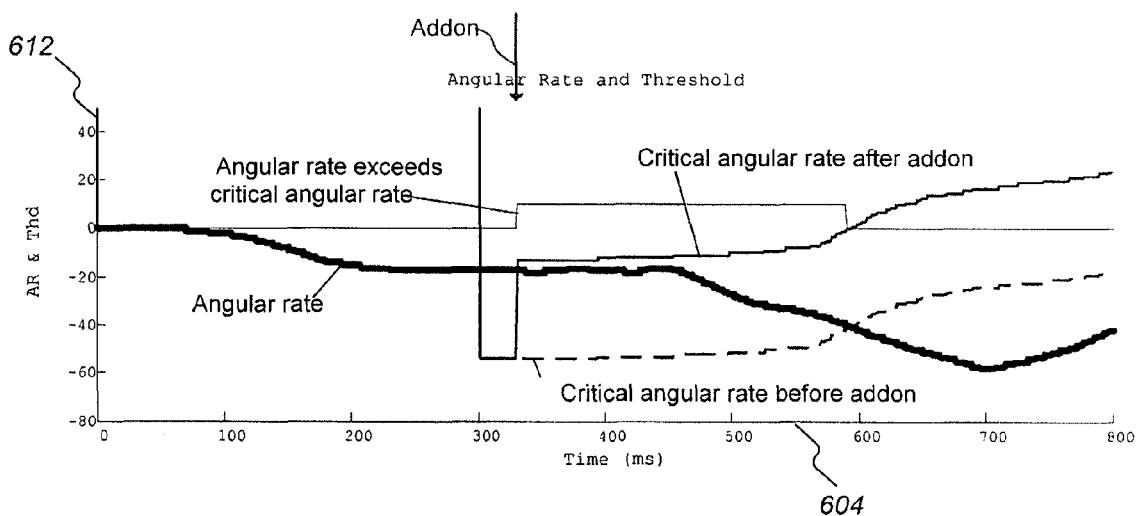

FIG. 6A and FIG. 6B illustrate response plots 600 for a soil-tripped rollover event. Time values are measured along an x-axis 604, values of the lateral acceleration and angular rate are measured along respective y-axes 608, 612. As shown, two different sets of threshold curves tuned separately for soil- and curb-tripped rollovers are selected by the path decision module 208. A critical lateral acceleration corresponding to a current value of the combined velocity is determined according to the selected threshold curve. If an absolute value of the current filtered lateral acceleration is greater than or equal to the critical acceleration, a predefined add-on as determined in the critical angular rate add-on value module 228 is provided to sensitize the value of critical angular rate.

FIG. 6B illustrates how values indicative of angular rates are used to make a decision related to whether a rollover or non-rollover event is occurring. As discussed previously, the angular rates are summed or integrated to obtain a roll angle. A critical angular rate can be calculated by the threshold curve in angle-angular rate domain. The threshold curve is tuned separately for soil- and curb-tripped rollover. The path decision provided by the add-on calculation block chooses a corresponding threshold curve. The critical angular rate is modified by the add-on value from the critical angular rate add-on value module 228. As shown in FIG. 6A, the filtered lateral acceleration does not exceed the path decision line. Therefore, it is classified as a "soil-tripped" rollover event. As a consequence, a curb trip flag is set to zero and a soil-tripped threshold curve is selected for the add-on calculation. In this example, an add-on to the critical angular rate is provided because a filtered lateral acceleration exceeds a critical lateral acceleration.

Figure 7A:
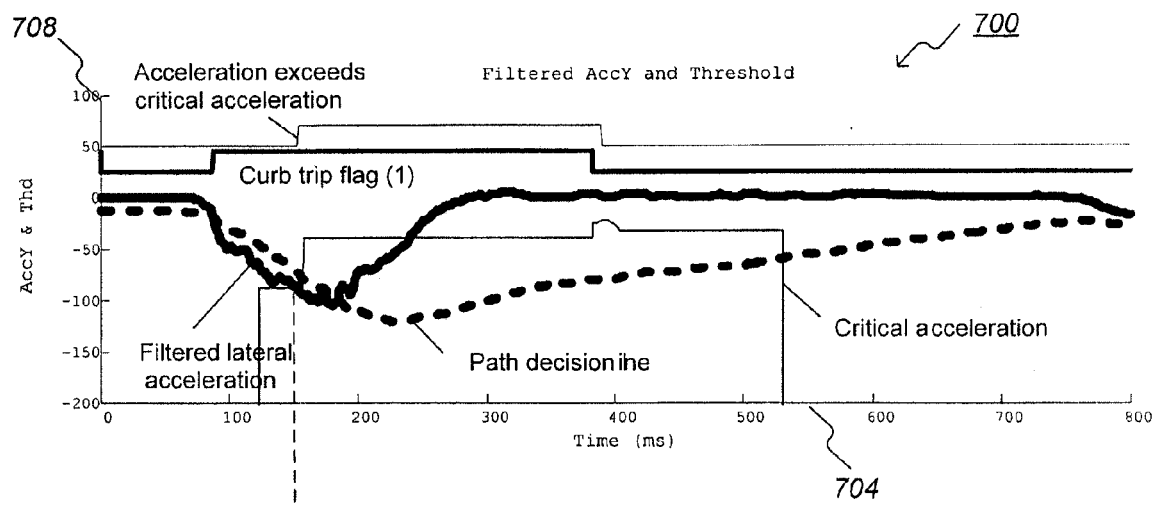
FIG. 7 is a diagram of a response for a curb-tripped rollover event.
Figure 7B:
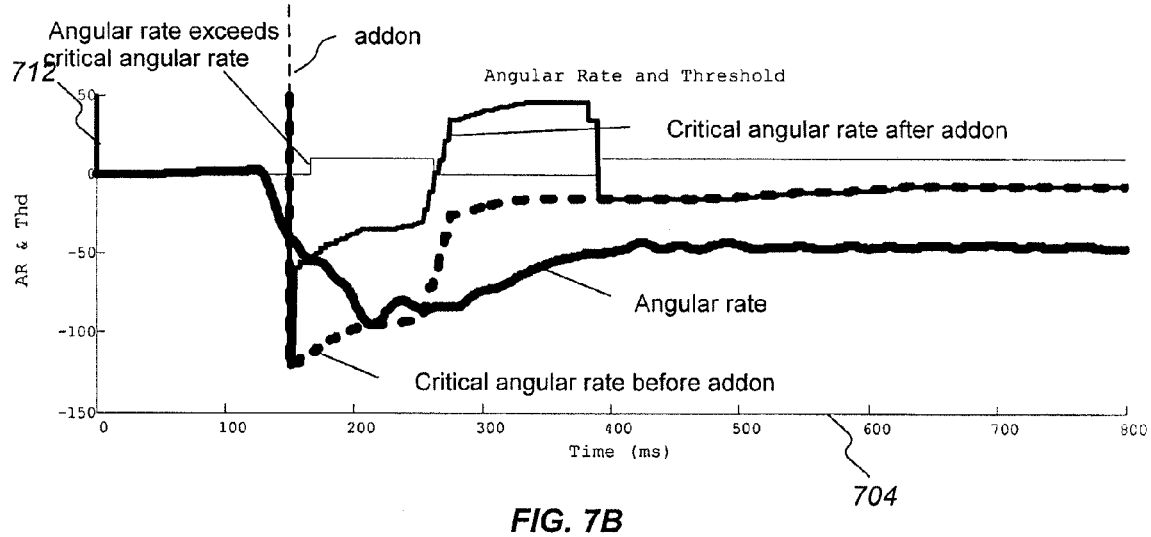

FIG. 7A and FIG. 7B illustrate a response plot 700 for a curb-tripped rollover event. Time values are measured along an x-axis 704, values of the lateral acceleration and angular rate are measured along respective y-axes 708, 712. In this case, the plot is classified as "curb trip" because the filtered lateral acceleration exceeds the path decision line, and the curb trip flag is set to one.

Thus, the invention provides, among other things, a method and system for controlling a restraint device during a crash that include classifying the crash as either a soil-tripped or curb-tripped rollover event. Various features of the invention are set forth in the following claims.

What is claimed is:

1. A method of controlling a restraint device in a vehicle during a crash, the method comprising:
    sensing a lateral acceleration, a vertical acceleration, and an angular rate of the vehicle;
    filtering the lateral acceleration and the angular rate;
    integrating the lateral acceleration to obtain a lateral velocity, the vertical acceleration to obtain a vertical velocity, and the angular rate to obtain an angle;
    determining a combined velocity based on the lateral acceleration;
    classifying the crash based on the combined velocity and the filtered lateral acceleration;
    determining a critical lateral acceleration and a critical angular rate for the crash;
    comparing the critical lateral acceleration with the filtered lateral acceleration, and the critical angular rate with the filtered angular rate; and
    generating a deployment signal to activate the restraint device.

2. The method of claim 1, wherein classifying the crash includes classifying the crash as one of a soil-tripped crash and a curb-tripped crash.

3. The method of claim 2, wherein classifying the crash as one of a soil-tripped crash and a curb-tripped crash includes
    comparing the filtered lateral acceleration with a threshold;
    assigning the crash as one of a soil-tripped crash and a curb-tripped crash when the filtered lateral acceleration is above the threshold; and
    assigning the crash as the other of a soil-tripped crash and a curb-tripped crash when the filtered lateral acceleration is below the threshold.

4. The method of claim 3, wherein the threshold comprises a straight-line threshold.

5. The method of claim 1, further comprising determining a sensitized critical angular rate based on the comparison between the filtered lateral acceleration and the critical lateral acceleration.

6. The method of claim 1, wherein determining the combined velocity comprises:
    time-weighing the filtered lateral acceleration; and
    summing the time-weighed filtered lateral acceleration, the lateral velocity, and the vertical velocity.

7. The method of claim 1, wherein the combined velocity is used to determine the critical lateral acceleration.

8. The method of claim 1, wherein the angle is used to determine the critical angular rate.

9. The method of claim 1, further comprising calculating a critical angular rate add-on value based on the comparison of the filtered lateral acceleration and the critical lateral acceleration.

10. A method of controlling a restraint device in a vehicle during a crash, the method comprising:
    sensing a first acceleration of the vehicle, a second acceleration of the vehicle, and an angular rate of the vehicle;
    estimating a first velocity from the first acceleration, a second velocity from the second acceleration, and a roll angle from the angular rate;
    calculating a time-weighed acceleration based on the first acceleration;
    calculating a combined velocity based on the time-weighed acceleration, the first velocity, and the second velocity;
    classifying the crash based on the combined velocity and the first acceleration;
    calculating at least one critical acceleration and at least one critical angular rate;
    selecting one of the at least one critical accelerations and one of the at least one critical angular rates based on the classification of the crash;
    comparing the selected critical acceleration to the first acceleration, and the selected critical angular rate to the angular rate; and
    generating a deployment signal when the first acceleration is greater than or equal to the selected critical acceleration, and when the angular rate is greater than or equal to the selected critical angular rate.

11. The method of claim 10, wherein the crash is classified as one of a soil-tripped crash and a curb-tripped crash.

12. The method of claim 11, wherein classifying the crash into one of a soil-tripped crash and a curb-tripped crash comprises:
    filtering the first acceleration;
    comparing the filtered first acceleration with a threshold;
    assigning the crash as one of a soil-tripped crash and a curb-tripped crash when the filtered first acceleration is above the threshold; and
    assigning the crash as the other of a soil-tripped crash and a curb-tripped crash when the filtered first acceleration is below the threshold.

13. The method of claim 12, wherein the threshold comprises a straight-line threshold.

14. The method of claim 12, further comprising determining a sensitized critical angular rate based on the comparison between the filtered first acceleration and the selected critical acceleration.

15. The method of claim 12, wherein calculating the combined velocity includes summing the time-weighed acceleration, the first velocity, and the second velocity.

16. The method of claim 12, wherein the combined velocity is used to calculate the at least one critical acceleration.

17. The method of claim 10, wherein the roll angle is used to calculate the at least one critical angular rate.

18. The method of claim 10, further comprising calculating a critical angular rate add-on value based on the comparison of the selected critical acceleration and the first acceleration.

19. A control system for a restraint device in a vehicle, the system comprising:
    a lateral acceleration sensor configured to sense a lateral acceleration of the vehicle;
    a vertical acceleration sensor configured to sense a vertical acceleration of the vehicle;
    an angular rate sensor configured to sense an angular rate of the vehicle;
    a first filter configured to filter the lateral acceleration of the vehicle and a second filter configured to filter the angular rate of the vehicle;
    a first summing module configured to obtain a lateral velocity, a second summing module configured to obtain a vertical velocity, and a third summing module configured to obtain a roll angle;
    a combined velocity module configured to determine a combined velocity of the vehicle based on the lateral acceleration, the lateral velocity, and the vertical velocity;
    a decision module configured to classify a crash based on the combined velocity and filtered lateral acceleration;
    a critical lateral acceleration module configured to determine a critical lateral acceleration;
    a critical angular rate module configured to determine a critical angular rate;

a first comparator configured to compare the critical lateral acceleration with the filtered lateral acceleration, and a second comparator configured to compare the critical angular rate with the filtered angular rate; and a deployment signal generator configured to generate a deployment signal to activate the restraint device.

20. The system of claim 19, further comprising an add-on value module configured to calculate a critical angular rate add-on value based on the comparison of the critical lateral acceleration and the filtered lateral acceleration.

* * * * *